US010089942B2

(12) United States Patent
Moon et al.

(10) Patent No.: US 10,089,942 B2
(45) Date of Patent: Oct. 2, 2018

(54) DISPLAY DEVICE AND DRIVING METHOD THEREOF

(71) Applicant: Samsung Display Co., Ltd., Yongin-si, Gyeonggi-do (KR)

(72) Inventors: Hoisik Moon, Asan-si (KR); Jae-seok Choi, Uijeongbu-si (KR); Kang-hyun Kim, Seoul (KR); Jong-hee Na, Asan-si (KR); Juneyoung Lee, Seoul (KR); Hyungwoo Yim, Hwaseong-si (KR); Jae-seob Chung, Asan-si (KR); Min-yup Chae, Cheonan-si (JP); Jung-suk Han, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 70 days.

(21) Appl. No.: 15/255,697

(22) Filed: Sep. 2, 2016

(65) Prior Publication Data

US 2017/0206846 A1 Jul. 20, 2017

(30) Foreign Application Priority Data

Jan. 18, 2016 (KR) ........................ 10-2016-0006073

(51) Int. Cl.
*G09G 3/36* (2006.01)
*G09G 3/32* (2016.01)
(Continued)

(52) U.S. Cl.
CPC ......... *G09G 3/3607* (2013.01); *G09G 3/2003* (2013.01); *G09G 3/3611* (2013.01);
(Continued)

(58) Field of Classification Search
CPC combination set(s) only.
See application file for complete search history.

(56) References Cited

U.S. PATENT DOCUMENTS

2004/0046725 A1 3/2004 Lee
2010/0053137 A1* 3/2010 Park .................... G09G 3/3225 345/211

(Continued)

FOREIGN PATENT DOCUMENTS

KR 10-1471154 B1 12/2014

*Primary Examiner* — Wesner Sajous
(74) *Attorney, Agent, or Firm* — Lewis Roca Rothgerber Christie LLP

(57) ABSTRACT

A display device includes a mapping unit for mapping main color data having information on three main colors to generate mapped main data including red, green, and blue information and mapped white data including white information, a compensation lookup table for storing a plurality of gamma compensation values, a gamma compensator for generating compensated main data obtained by gamma-compensating the mapped main data based on a first gamma compensation value corresponding to first gamma white data from among the plurality of gamma compensation values and a second gamma compensation value corresponding to second gamma white data from among the plurality of gamma compensation values by referring to the compensation lookup table, a renderer for sub-pixel-rendering the mapped white data to generate rendered white data, and a splitter for converting the rendered white data into the first and second gamma white data based on different first and second gamma curves, respectively.

20 Claims, 11 Drawing Sheets

(51) Int. Cl.

| | |
|---|---|
| ***H04N 1/60*** | (2006.01) |
| ***H04N 9/64*** | (2006.01) |
| ***H04N 9/69*** | (2006.01) |
| ***H04N 9/73*** | (2006.01) |
| ***G09G 3/20*** | (2006.01) |

(52) U.S. Cl.
CPC ............... *G09G 2300/0443* (2013.01); *G09G 2300/0452* (2013.01); *G09G 2320/0673* (2013.01); *G09G 2340/06* (2013.01)

(56) References Cited

U.S. PATENT DOCUMENTS

| | | | | |
|---|---|---|---|---|
| 2011/0057950 | A1* | 3/2011 | Kim | G09G 5/02<br>345/602 |
| 2011/0149166 | A1* | 6/2011 | Botzas | H04N 5/202<br>348/649 |
| 2014/0307964 | A1* | 10/2014 | Kim | H04N 9/77<br>382/167 |
| 2015/0062145 | A1* | 3/2015 | Chun | G09G 5/026<br>345/590 |
| 2016/0035292 | A1 | 2/2016 | Lee et al. | |
| 2017/0098429 | A1* | 4/2017 | Sullivan | G09G 5/06 |

* cited by examiner

FIG. 3A

SLUT

| W | dR | dG | dB |
|---|---|---|---|
| 0 | 0 | 0 | 0 |
| 1 | +5 | +3 | -10 |
| 2 | +8 | +5 | -14 |
| 3 | 0 | +4 | +5 |
| 4 | +6 | +2 | +4 |
| 5 | +2 | +1 | +3 |
| ⋮ | ⋮ | ⋮ | ⋮ |
| 254 | +2 | +3 | -5 |
| 255 | 0 | 0 | 0 |

FIG. 3B

SPLUT

| RW | HDA(DW1) | LDA(DW2) |
|---|---|---|
| 0 | 0 | 0 |
| 1 | 2 | 0 |
| 2 | 3 | 0 |
| 3 | 4 | 1 |
| 4 | 5 | 3 |
| 5 | 7 | 4 |
| ⋮ | ⋮ | ⋮ |
| 254 | 255 | 252 |
| 255 | 255 | 253 |

DISPLAY DEVICE AND DRIVING METHOD THEREOF

CROSS-REFERENCE TO RELATED APPLICATION

This application claims priority to and the benefit of Korean Patent Application No. 10-2016-0006073, filed on Jan. 18, 2016, the entire content of which is incorporated herein by reference.

BACKGROUND

The present disclosure herein relates to a display device for improving side visibility and a driving method thereof.

In general, a liquid crystal display device is driven in a manner that liquid crystal is injected between upper and lower substrates where a transparent electrode is formed and upper and lower polarizing plates are disposed at the outside of the upper and lower substrates to change the arrangement of the liquid crystal between the upper and lower substrates and to adjust the transmittance of light.

Additionally, the liquid crystal display device includes sub pixels configured with three primary colors (i.e., red, green, and blue) on a liquid crystal display panel in order to implement a color screen. Recently, in order to increase the brightness of a display image, a technique to further include white sub pixels in a liquid crystal display panel has been suggested.

SUMMARY

Aspects of embodiments of the present disclosure are directed toward a display device for improving side visibility and a driving method thereof.

An embodiment of the inventive concept provides a display device including: a mapping unit configured to map main color data having information on three main colors to generate mapped main data including red, green, and blue information and mapped white data including white information; a compensation lookup table configured to store a plurality of gamma compensation values; a gamma compensator configured to generate compensated main data obtained by gamma-compensating the mapped main data based on a first gamma compensation value corresponding to first gamma white data from among the plurality of gamma compensation values and a second gamma compensation value corresponding to second gamma white data from among the plurality of gamma compensation values by referring to the compensation lookup table; a renderer configured to sub-pixel-render the mapped white data to generate rendered white data; and a splitter configured to convert the rendered white data into the first and second gamma white data based on different first and second gamma curves, respectively.

In an embodiment, each of the plurality of gamma compensation values may include a red gamma compensation value, a green gamma compensation value, and a blue gamma compensation value to be compensated according to grayscale values of the first and second gamma white data.

In an embodiment, the gamma compensator may generate the compensated main data based on the first gamma compensation value and the second gamma compensation value.

In an embodiment, the first gamma compensation value may include a first red gamma compensation value, a first green gamma compensation value, and a first blue gamma compensation value; the second gamma compensation value may include a second red gamma compensation value, a second green gamma compensation value, and a second blue gamma compensation value; and the gamma compensator may add an average value of the first red gamma compensation value and the second red gamma compensation value, an average value of the first green gamma compensation value and the second green gamma compensation value, and an average value of the first blue gamma compensation value and the second blue gamma compensation value to the mapped main data to generate the compensated main data.

In an embodiment, the renderer may resample-filter the mapped white data to generate the rendered white data.

In an embodiment, the display device may further include a split lookup table for storing high white data values obtained by sampling-converting white data grayscale values based on the first gamma curve and for storing low white data values obtained by sampling-converting the white data grayscale values based on the second gamma curve; and the splitter may generate the first or second gamma white data by referring to the split lookup table.

In an embodiment, for the same grayscale value, the first gamma curve may have a higher brightness value than a reference gamma curve, and the second gamma curve may have a lower brightness value than the reference gamma curve.

In an embodiment, a gamma value of the reference gamma curve may be about 2.2.

In an embodiment, the display device may further include a data driver configured to convert the first and second gamma white data into first and second white pixel voltages, respectively.

In an embodiment, the display device may further include a display panel having a plurality of main logic pixels each comprising a first main sub pixel and a second main sub pixel and a plurality of white logic pixels each comprising a third main sub pixel and one of a plurality of white sub pixels configured to display white, wherein the first to third main sub pixels may display different main colors from among red, green, and blue, and wherein the display device is configured such that a first white sub pixel from among the plurality of white sub pixels may receive the first white pixel voltage and a second white sub pixel from among the plurality of white sub pixels may receive the second white pixel voltage.

In an embodiment, each of the plurality of main logic pixels may be adjacent to a corresponding one of the plurality of white logic pixels.

In an embodiment, the display device may further include a display panel having: a plurality of main logic pixels each comprising a first main sub pixel and a second main sub pixel and a plurality of white logic pixels each comprising a third main sub pixel and one of a plurality of white sub pixels configured to display white, wherein the first main sub pixel, the second main sub pixel, and the third main sub pixels may each display different main colors from among red, green, and blue; and wherein the display device is configured such that in a first section, a first white sub pixel from among the plurality of white sub pixels may receive the first gamma white voltage and a second white sub pixel from among the plurality of white sub pixels may receive the second gamma white voltage, and in a second section that is temporally subsequent to the first section, the first white sub pixel may receive the second gamma white voltage, and the second white sub pixel may receive the first gamma white voltage.

In an embodiment, each of the first and second sections may correspond to at least n frames (where n is a natural number).

For the same grayscale value, the first gamma curve may have a higher brightness value than a reference gamma curve; the second gamma curve may have a lower brightness value than the reference gamma curve; and the third gamma curve may have a lower brightness value than the first gamma curve and has a higher brightness value then the second gamma curve.

In an embodiment of the inventive concept, a display device driving method includes: mapping main color data having information on three main colors; generating mapped main data including red, green, and blue information and mapped white data including white information; gamma-compensating the mapped main data to generate compensated main data based on a first gamma compensation value corresponding to first gamma white data from among a plurality of gamma compensation values and a second gamma compensation value corresponding to second gamma white data from among the plurality of gamma compensation values; sub-pixel-rendering the mapped white data to generate rendered white data; and converting the rendered white data into first and second gamma white data based on different first and second gamma curves.

In an embodiment, each of the plurality of gamma compensation values may include a red gamma compensation value, a green gamma compensation value, and a blue gamma compensation value to be compensated according to white data grayscale values, the first gamma compensation value may include a first red gamma compensation value, a first green gamma compensation value, and a first blue gamma compensation value; and the second gamma compensation value may include a second red gamma compensation value, a second green gamma compensation value, and a second blue gamma compensation value.

In an embodiment, the generating of the compensated main data may include: calculating a first average value of the first red gamma compensation value and the second red gamma compensation value; calculating a second average value of the first green gamma compensation value and the second green gamma compensation value; calculating a third average value of the first blue gamma compensation value and the second blue gamma compensation value; and adding the first and third average values to the mapped main data to generate the compensated main data.

In an embodiment, the first gamma curve may have a higher brightness value than a reference gamma curve for the same grayscale value, and the second gamma curve may have a lower brightness value than the reference gamma curve for the same grayscale value.

In an embodiment, a gamma value of the reference gamma curve may be about 2.2.

In an embodiment, the method may further include converting the first and second gamma white data into first and second white pixel voltages, respectively.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 3A is a detailed view of a compensation lookup table according to an embodiment of the inventive concept;

FIG. 3B is a detailed view of a split lookup table according to an embodiment of the inventive concept;

DETAILED DESCRIPTION

Figure 1A:
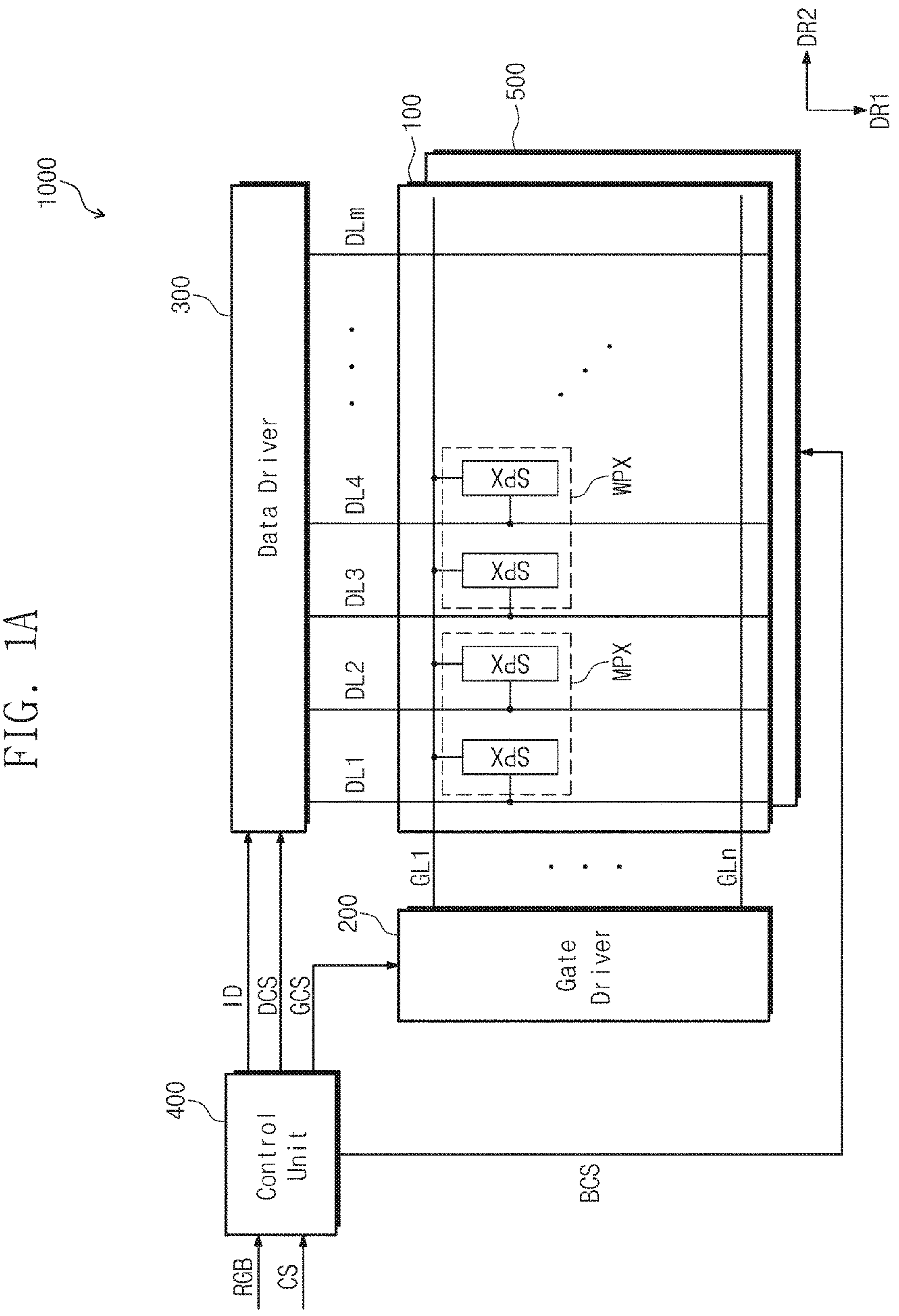
FIG. 1A is a schematic block diagram of a display device according to an embodiment of the inventive concept.

Various suitable modifications are possible in various embodiments of the inventive concept and specific embodiments are illustrated in drawings and related detailed descriptions are listed. However, this does not limit various embodiments of the inventive concept to a specific embodiment and it should be understood that the inventive concept covers all of the modifications, equivalents, and/or replacements of this disclosure provided they come within the scope of the appended claims and their equivalents.

Like reference numerals refer to like elements (or components) throughout the drawings. In the accompanying drawings, the dimensions of structures may appear larger than they actually are for the clarity of the inventive concept.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

A relevant device or component (or relevant devices or components) according to embodiments of the present invention described herein may be implemented utilizing any suitable hardware (e.g., an application-specific integrated circuit), firmware (e.g., a DSP or FPGA), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Spatially relative terms, such as "top," "bottom," "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Hereinafter, embodiments of the inventive concept are described in more detail with reference to the accompanying drawings.

Figure 1B:
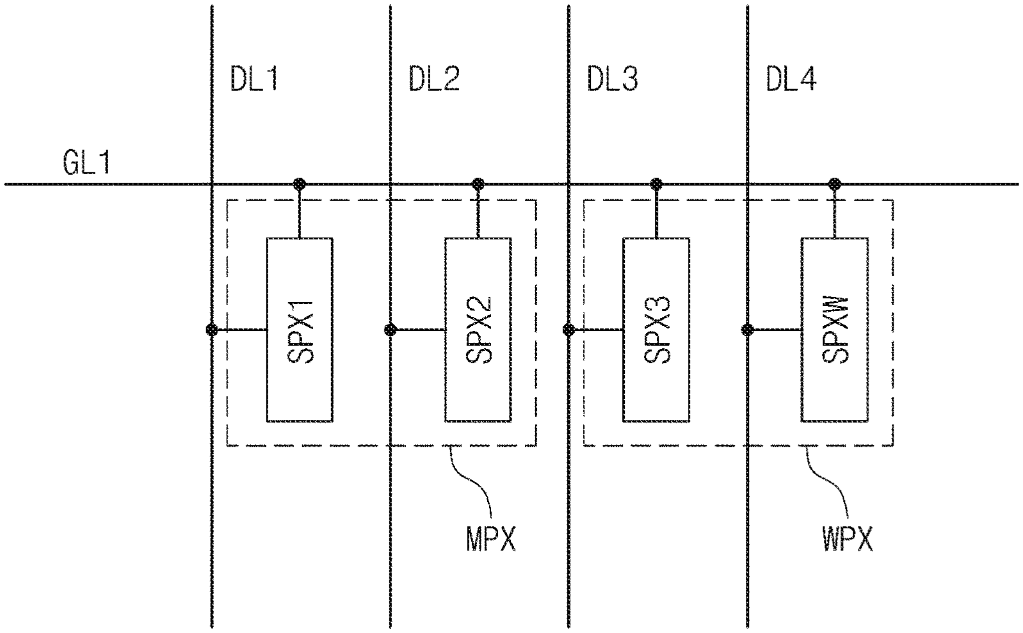
FIG. 1B is a detailed view illustrating some sub pixels according to an embodiment of the inventive concept.

FIG. 1A is a schematic block diagram of a display device according to an embodiment of the inventive concept and FIG. 1B is a view illustrating some sub pixels according to an embodiment of the inventive concept.

Referring to FIGS. 1A and 1B, a display device 1000 includes a display panel 100 for displaying an image, a gate driver 200 and a data driver 300 for driving the display panel 100, and a controller 400 (e.g., a control unit 400) for controlling the driving of the gate driver 200 and the data driver 300.

The controller 400 receives input image data RGB and a plurality of control signals CS from the outside of the display device 1000. The controller 400 converts a data format of the input image data RGB to correspond to the interface specification of the data driver 300 to generate image data ID and provides the image data ID to the data driver 300.

Additionally, the controller 400 generates a data control signal DCS (for example, an output start signal, a parallel start signal, and so on) and a gate control signal GCS (for example, a vertical start signal, a vertical clock signal, and a vertical clock bar signal) based on the plurality of control signals CS. The data control signal DCS is provided to the data driver 300, and the gate control signal GCS is provided to the gate driver 200.

The gate driver 200 outputs gate signals sequentially in response to the gate control signal GCS provided from the controller 400.

The data driver 300 converts the image data ID into data voltages and outputs the data voltages in response to the data control signal DCS provided from the controller 400. The outputted data voltages are applied to the display panel 100.

The display panel 100 may include a plurality of gate lines GL1 to GLn, a plurality of data lines DL1 to DLm, a plurality of main logic pixels MPX, and a plurality of white logic pixels WPX. Each of the plurality of main logic pixels MPX may include first and second main sub pixels SPX1 and SPX2 and each of the plurality of white logic pixels WPX may include a third main sub pixel SPX3 and a white sub pixel SPXW for displaying white. The first to third main sub pixels SPX1 to SPX3 may display main colors (e.g., primary colors). In more detail, the first to third main sub pixels SPX1 to SPX3 may display a different main color from among red, green, and blue. For example, the first main sub pixel SPX1 may display red color, the second main sub pixel SPX2 may display green color, and the third main sub pixel SPX3 may display blue color.

The plurality of main logic pixels MPX and the plurality of white logic pixels WPX are devices for displaying a unit image that configures an image, and according to the number of the plurality of main logic pixels MPX and the plurality of white logic pixels WPX provided in the display panel 100, the resolution of the display panel 100 may be determined. Referring to FIG. 1A, only one of the plurality of main logic pixels MPX and only one of the plurality of white logic pixels WPX are shown and the remaining pixels are omitted.

For convenience of description, the first to third main sub pixels SPX1 to SPX3 and the white sub pixel SPXW are each referred to as a sub pixel SPX (e.g., any of the first to third main sub pixels SPX1 to SPX3 and the white sub pixel SPXW may be generically referred to as the sub pixel SPX).

The plurality of gate lines GL1 to GLn extend in a second direction DR2 and are arranged parallel to each other in a first direction DR1 vertical to (e.g., perpendicular to) the second direction DR2. The plurality of gate lines GL1 to GLn are connected to the gate driver 200 and receive the gate signals from the gate driver 200.

The plurality of data lines DL1 to DLm extend in the first direction DR1 and are arranged parallel to each other in the second direction DR2. The plurality of data lines DL1 to DLm are connected to the data driver 300 to receive the data voltages from the data driver 300.

The sub pixel may be connected to a corresponding gate line from among the plurality of gate lines GL1 to GLn and a corresponding data line from among the plurality of data lines DL1 to DLm and driven.

The display device 1000 may further include a backlight 500. The backlight 500 is disposed at the rear of the display panel 100 and faces the display panel 100. The backlight 500 receives a backlight control signal BCS generated from the controller 400. The backlight 500 generates light in response to the backlight control signal BCS and supplies the light to the display panel 100.

Figure 2A:
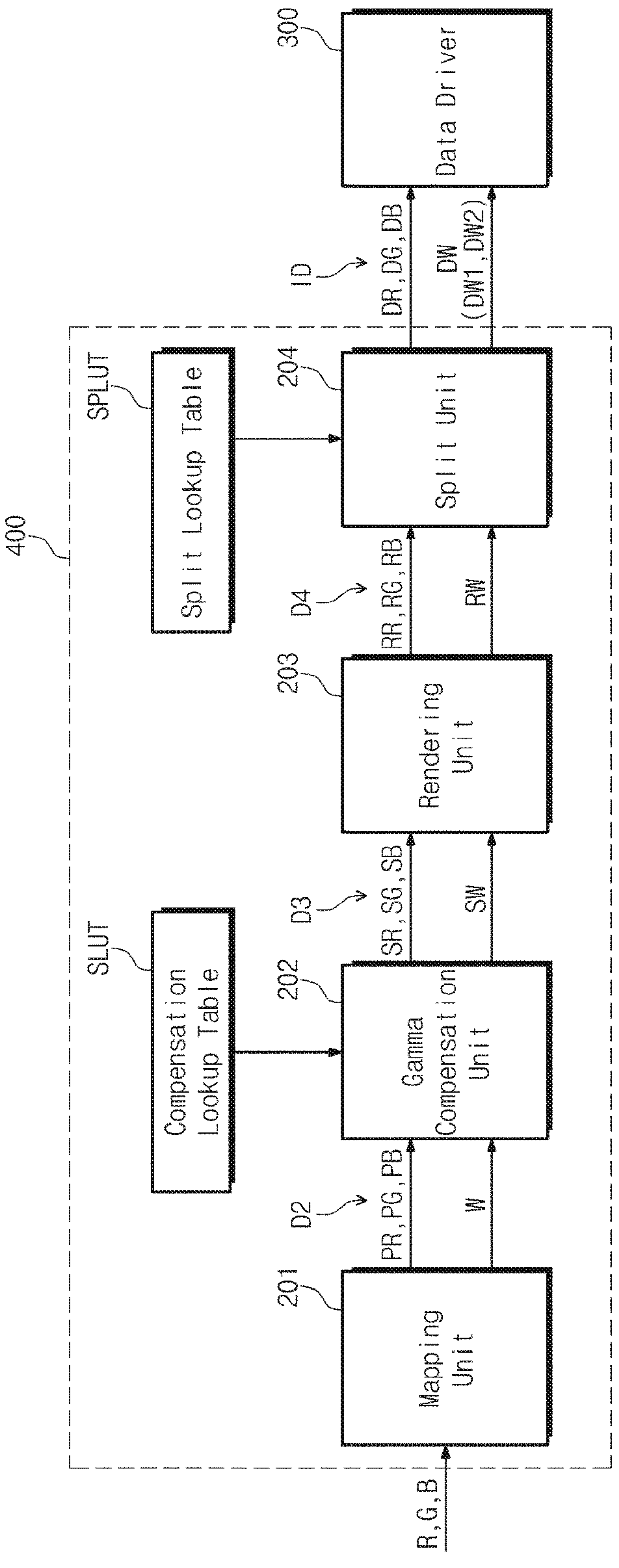
FIG. 2A is a block diagram of a controller according to an embodiment of the inventive concept.
Figure 2B:
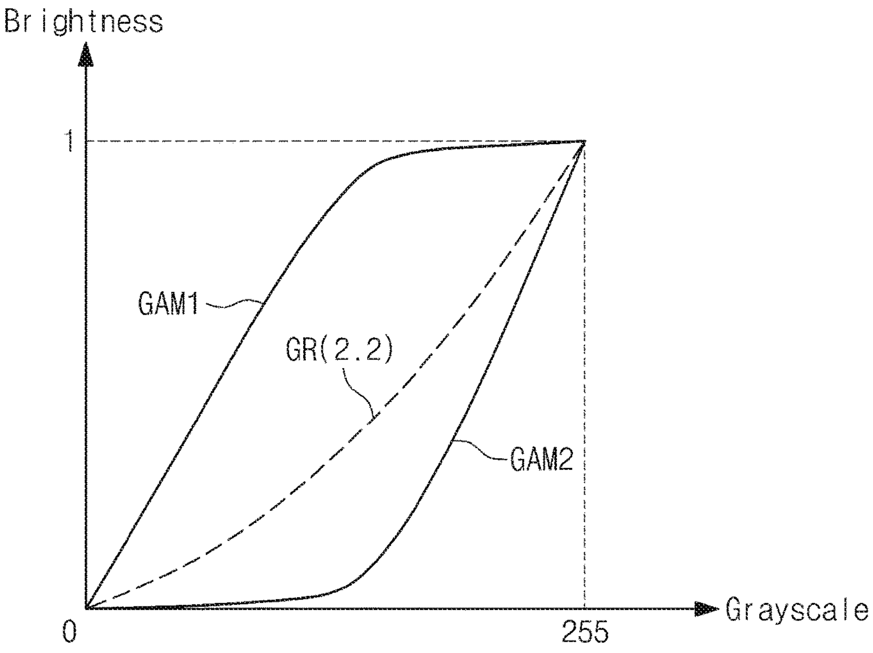
FIG. 2B is a graph illustrating a first gamma curve and a second gamma curve.

FIG. 2A is a block diagram of the controller 400 according to an embodiment of the inventive concept and FIG. 2B is a graph illustrating a first gamma curve and a second gamma curve.

Referring to FIGS. 1A, 2A, and 2B, the controller 400 may include a mapping unit 201, a gamma compensator 202 (e.g., a gamma compensation unit 202), a renderer 203 (e.g., a rendering unit 203), a splitter 204 (e.g., a split unit 204), a compensation lookup table SLUT, and a split lookup table SPLUT.

The mapping unit 201 may map main color data R, G, and B having information on three main colors to generate mapping data D2. According to an embodiment of the inventive concept, the three main colors may be red, green, and blue.

The mapping unit 201 may map the RGB gamut of the main color data R, G, and B into an RGBW gamut through a Gamut Mapping Algorithm (GMA) to generate mapping data. The mapping data D2 may include mapping main data PR, PG, and PB (e.g., mapped main data PR, PG, and PB) including red, green, and blue information and mapping white data W (e.g., mapped white data W) including white information.

The mapping data D2 may be provided to the gamma compensator 202.

The gamma compensator 202 may receive the mapping data D2 and, by referring to the compensation lookup table SLUT, generate compensation data D3. The compensation data D3 may include compensation main data SR, SG, and SB (e.g., compensated main data SR, SG, and SB) obtained by gamma-compensating the mapping main data PR, PG, and PB and compensation white data SW generated based on the mapping white data W. According to an embodiment of the inventive concept, the gamma compensator 202 may generate the compensation white data SW without performing image processing on the mapping white data W. That is, the compensation white data SW may be identical to the mapping white data W.

A process of the gamma compensator 202 to generate the compensation main data SR, SG, and SB and the compensation white data SW is described later.

The compensation data D3 may be provided to the renderer 203.

The renderer 203 may receive the compensation data D3 and generate rendering data D4 through the rendering operation. The rendering data D4 may include rendering main data RR, RG, and RB respectively corresponding to the compensation main data SR, SG, and SB and rendering white data RW (e.g., rendered white data RW) corresponding to the compensation white data SW.

The renderer 203 may include a re-sample filtering operation and a sharp filtering operation in order for the rendering operation. The re-sample filtering operation may be a process for converting data based on a target pixel from among the compensation main data SR, SG, and SB and the compensation white data SW based on data corresponding to the target pixel and peripheral pixels adjacent to the target pixel.

The target pixel may be one pixel from among the plurality of white sub pixels included in the display panel 100. The above-mentioned driving processes and driving processes described later may be applied to the target pixel. It is apparent that the above-mentioned operations and operations described later are applied to each of the remaining pixels other than the target pixel from among the plurality of white sub pixels.

The sharp filtering operation may be a process for determining the line, edge, point, and diagonal form and the position of an image based on the compensation main data SR, SG, and SB and the compensation white data SW, and based on the determined data, compensating the compensation main data SR, SG, and SB and the compensation white data SW.

In FIG. 2A, the front end of the mapping unit 201 may further include an input gamma converter (e.g., an input gamma conversion unit). The input gamma converter may adjust and output the gamma characteristics of the main color data R, G, and B in order to easily process data in the following mapping unit 201 and renderer 203. For example, the input gamma converter may linearize and output the main color data R, G, and B to allow the non-linear gamma characteristics of the main color data R, G, and B to be proportional to brightness.

Additionally, in correspondence thereto, the rear end of the renderer 203 may further include an output gamma converter (e.g., an output gamma conversion unit). The output gamma converter performs inverse gamma conversion on the rendering main data RR, RG, and RB and the rendering white data FW in order to non-linearize and output the rendering main data RR, RG, and RB and the rendering white data FW.

The rendering data D4 outputted from the output gamma convertor may be provided to the splitter 204.

The splitter 204 may output the image data ID by referring to the split lookup table SPLUT. The image data ID may include image white data DW obtained by converting the rendering white data RW based on the image main data DR, DG, and DB and a gamma curve. According to an embodiment of the inventive concept, data DR, DG, and DB in the image may be identical to the rendering main data RR, RG, and RB.

For example, the image white data DW may include first and second gamma white data DW1 and DW2.

The first gamma white data DW1 may be data obtained by converting the rendering white data RW based on the first gamma curve GAM1.

In the same grayscale value (e.g., gray level), the first gamma curve GAM1 may have a higher brightness value than a reference gamma curve GR and the second gamma curve GAM2 may have a lower brightness value than the reference gamma curve GR.

For example, a gamma value of the reference gamma curve GR may be 2.2.

Referring to FIG. 2B, the first gamma curve GAM1, the second gamma curve GAM2, and the reference gamma curve GR may be shown on a graph where an X-axis is a grayscale value and a Y-axis is a brightness. The grayscale values range from 0 to 255 and the brightness values range from 0 to 1.

Except for when the grayscale value is 0 or 255, the first gamma curve GAM1 may have a higher brightness value than the reference gamma curve GR for the same grayscale value.

Additionally, except for when the grayscale value is 0 or 255, the second gamma curve GAM2 may have a lower brightness value than the reference gamma curve GR for the same grayscale value.

The split lookup table SPLUT may store high white data values HDA (see FIG. 3B) obtained by converting the white data grayscale values based on the first gamma curve GAM1 and low white data values LDA (see FIG. 3B) obtained by converting the white data grayscale values based on the second gamma curve GAM2.

The splitter 204 may determine a grayscale value of high white data corresponding to a grayscale value of the rendering white data RW from among grayscale values of the high white data HDA by referring to the split lookup table SPLUT, and may generate the first gamma white data DW1 in order to have the determined grayscale value of the high white data.

Similar to this, the splitter 204 may determine a grayscale value of low white data corresponding to a grayscale value of the rendering white data RW from among grayscale values of the low white data LDA by referring to the split lookup table SPLUT, and may generate the second gamma white data DW2 in order to have the determined grayscale value of the low white data.

As mentioned above, the data driver 300 may receive the image data ID to convert it to a data voltage.

For example, in relation to the target pixel, when the splitter 204 generates the first gamma white data DW1, the target pixel may receive a high voltage based on the first gamma curve GAM1 through the data driver 300 to display an image, and when the splitter 204 generates the second gamma white data DW2, the target pixel may receive a low voltage based on the second gamma curve GAM2 through the data driver 300 to display an image.

FIG. 3A is a detailed view of a compensation lookup table according to an embodiment of the inventive concept, and FIG. 3B is a detailed view of a split lookup table according to an embodiment of the inventive concept.

Referring to FIGS. 2A, 3A, and 3B, as mentioned above, the gamma compensator 202 may generate the compensation data D3 by referring to the compensation lookup table SLUT.

A plurality of gamma compensation values may be stored in the compensation lookup table SLUT.

Each of the plurality of gamma compensation values may include a red gamma compensation value dR, a green gamma compensation value dG, and a blue gamma compensation value dB to be compensated according to the first and second gamma white data DW1 and DW2 grayscale values.

In the compensation lookup table SLUT, a gamma compensation value corresponding to the first gamma white data DW1 may be defined as a first gamma compensation value, and the first gamma compensation value may include a first red gamma compensation value, a first green gamma compensation value, and a first blue gamma compensation value.

A gamma compensation value corresponding to the second gamma white data DW2 may be defined as a second gamma compensation value, and the second gamma compensation value may include a second red gamma compensation value, a second green gamma compensation value, and a second blue gamma compensation value.

For example, when the target pixel receives the high voltage based on the first gamma curve GAM1 to display an image, the gamma compensator 202 may add an average value of the first red gamma compensation value and the second red gamma compensation value, an average value of the first green gamma compensation value and the second green gamma compensation value, and an average value of the first blue gamma compensation value and the second blue gamma compensation value to the mapping main data PR, PG, and PB to generate the compensation main data SR, SG, and SB.

In more detail, when the rendering white data RW value of the target pixel is 4, the split lookup table SPLUT of FIG. 3B may store 5 (that is, a grayscale value of high white data corresponding to the rendering white data RW) and 3 (that is, a grayscale value of low white data corresponding to the rendering white data RW). That is, a grayscale value of first gamma white data corresponding to the target pixel may be 5 and a grayscale value of second gamma white data corresponding to the target pixel may be 3.

At this point, as shown in FIG. 3A, when a grayscale value of the first gamma white data DW1 is 5 in the compensation lookup table SLUT, the first red gamma compensation value is 2, the first green gamma compensation value is 1, and the first blue gamma compensation value is 3, and when a grayscale value of the second gamma white data DW2 is 3, the second red gamma compensation value is 0, the second green gamma compensation value is 4, and the second blue gamma compensation value is 5.

The gamma compensator 202 calculates an average value of the first red gamma compensation value and the second red gamma compensation value as (2+0)/2=1, calculates an average value of the first green gamma compensation value and the second green gamma compensation value as (1+4)/

2=2.5, and calculates an average value of the first blue gamma compensation value and the second blue gamma compensation value as (3+5)/2=4.

Accordingly, the gamma compensator 202 adds the calculated final gamma compensation values 1, 2.5, and 4 to the mapping main data PR, PG, and PB to generate the compensation main data SR, SG, and SB.

For example, when the mapping main data PR, PG, and PB for the target pixel are 10, 12, and 13 for a red grayscale value, a green grayscale value, and a blue grayscale value, respectively, a red grayscale value, a green grayscale value, and a blue grayscale value of the compensation main data SR, SG, and SB may be 11, 14.5, and 17, respectively.

When the target pixel receives the low voltage based on the second gamma curve GAM2 to display an image, the gamma compensator 202 may add the final gamma compensation values 1, 2.5, and 4 to the mapping main data PR, PG, and PB and at this point, a red grayscale value, a green grayscale value, and a blue grayscale value of the compensation main data SR, SG, and SB may be 11, 14.5, and 17, respectively.

Although it is described that the gamma compensator 202 calculates the final gamma compensation value, embodiments of the inventive concept are not limited thereto, and a final gamma compensation value may be calculated through various suitable methods.

When one of the plurality of white sub pixels receives the high voltage based on the first gamma curve GAM1 or receives the low voltage based on the second gamma curve GAM2, typically, the gamma compensator 202 applies a gamma compensation value for the mapping white data W. Accordingly, in the splitter 204, before the first gamma white data DW1 or the second gamma white data DW2 is generated, gamma compensation on the mapping main data PR, PG, and PB is performed and the display panel 100 is driven based on the first gamma white data DW1 or the second gamma white data DW2 generated according thereto. Accordingly, side visibility distortion may occur in displaying an image on the display panel 100.

To compensate for this, the inventive concept includes the gamma compensator 202 for determining a final gamma compensation value by using a gamma compensation value corresponding to the first gamma white data DW1 and a gamma compensation value corresponding to the second gamma white data DW2. As the gamma compensator 202 performs gamma compensation by using the final gamma compensation value, side visibility distortion occurring as each of a plurality of white sub pixels receives a high voltage or low voltage may be improved.

Figure 4A:
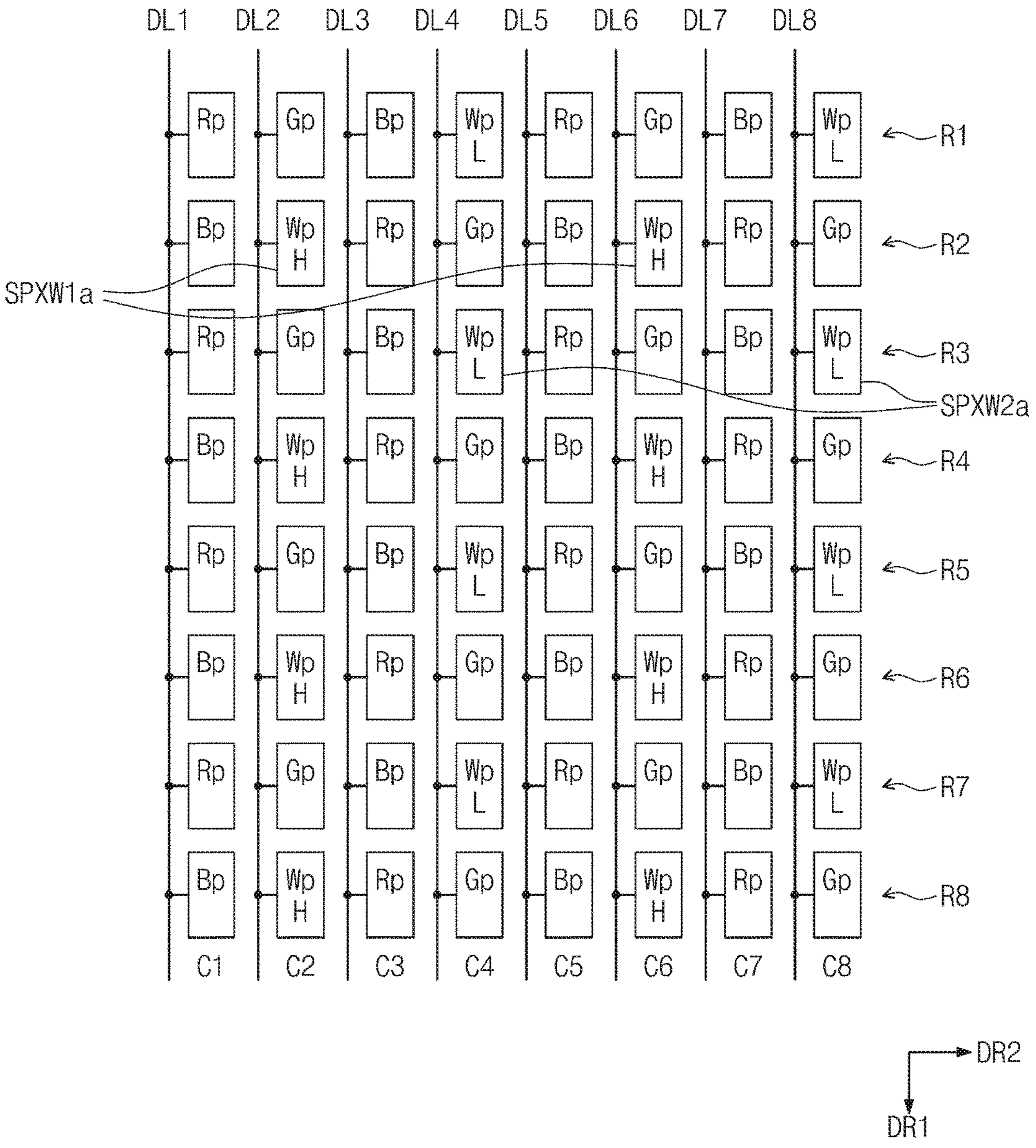
FIG. 4A is a view illustrating time division driving of a display panel according to an embodiment of the inventive concept.
Figure 4B:
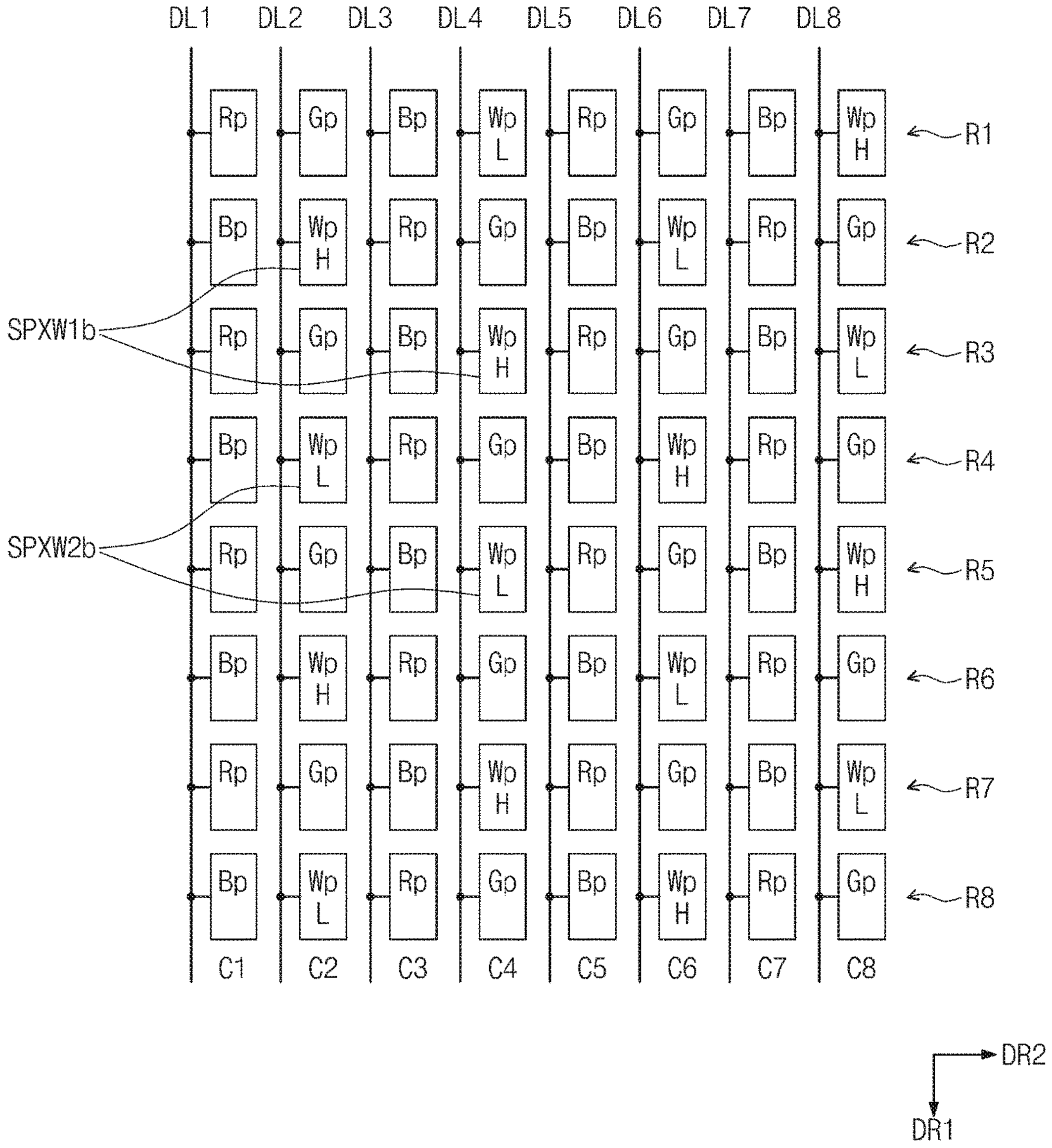
FIG. 4B is a view illustrating time division driving of a display panel according to another embodiment of the inventive concept.
Figure 4C:
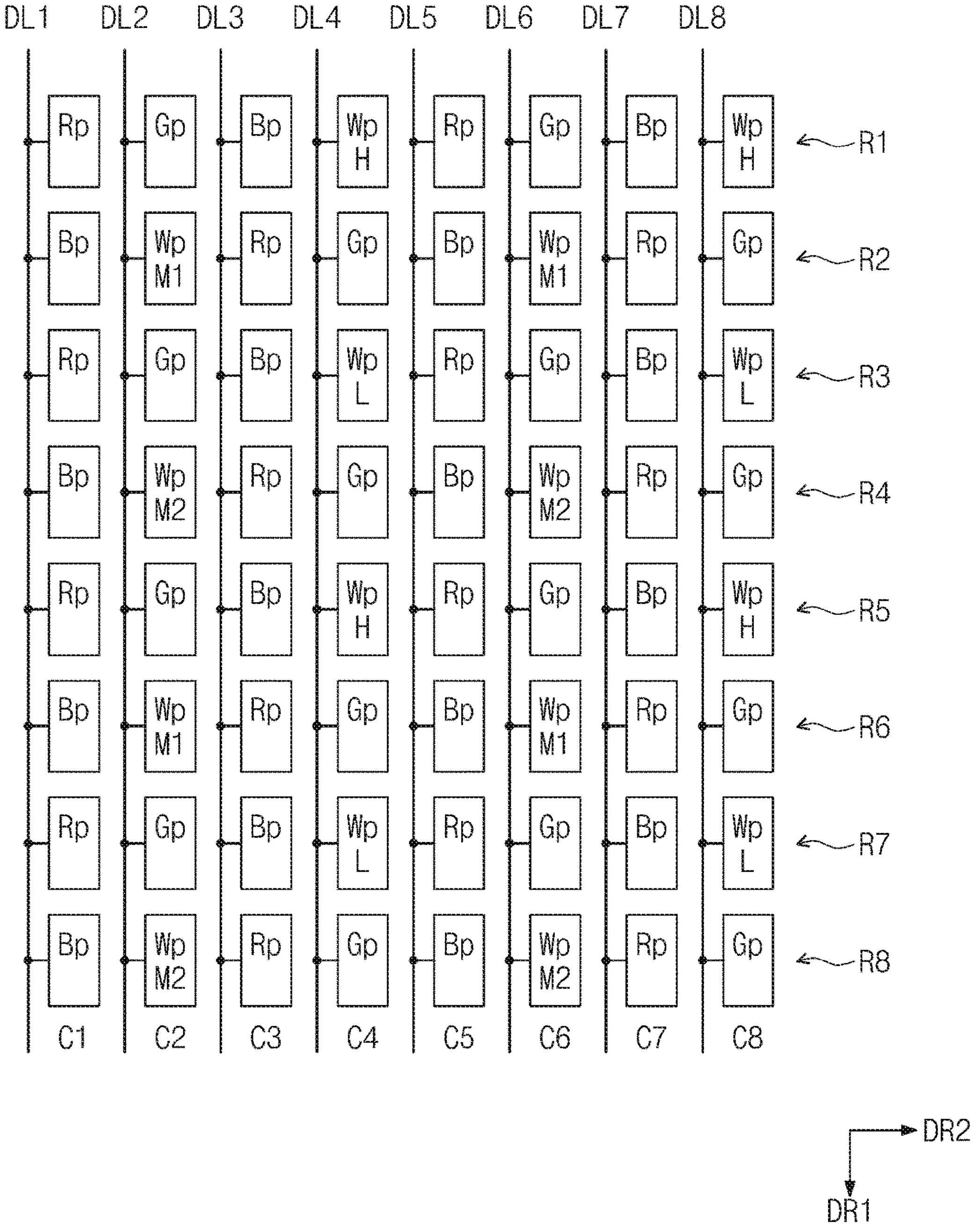
FIG. 4C is a view illustrating time division driving of a display panel according to another embodiment of the inventive concept.
Figure 4D:
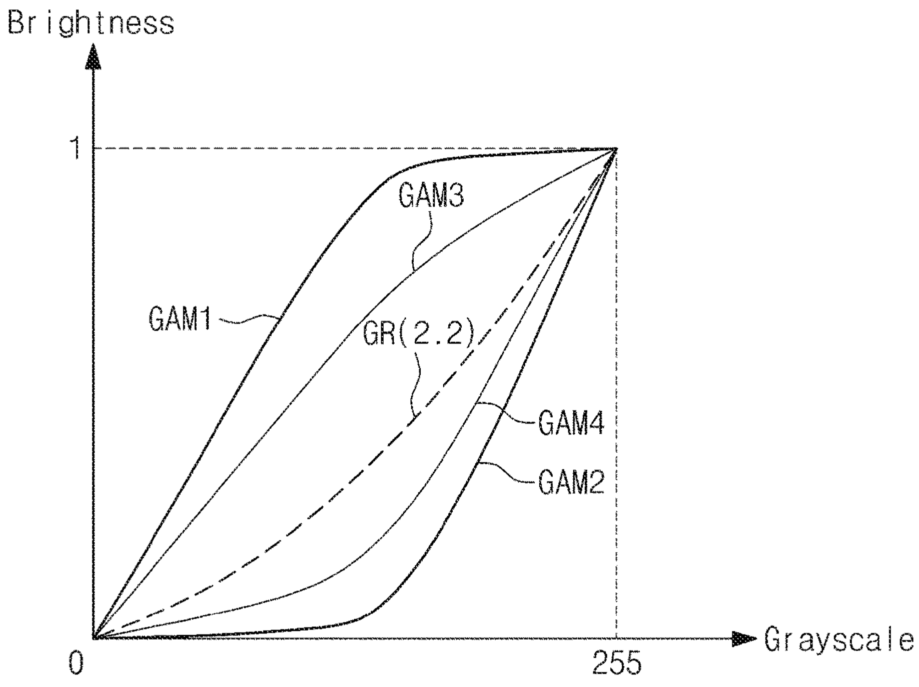
FIG. 4D is a graph illustrating first to fourth gamma curves.

FIG. 4A is a view illustrating space division driving of a display panel according to an embodiment of the inventive concept, FIG. 4B is a view illustrating space division driving of a display panel according to another embodiment of the inventive concept, FIG. 4C is a view illustrating space division driving of a display panel according to another embodiment of the inventive concept, and FIG. 4D is a graph illustrating first to fourth gamma curves.

FIGS. 4A to 4C illustrate the display panel 100 having a structure in common.

Referring to FIGS. 1A and 4A to 4C, the plurality of main logic pixels MPX and the plurality of white logic pixels WPX connected to first to eighth data lines DL1 to DL8 are shown in the display panel 100.

As shown in FIGS. 4A to 4C, the first main sub pixels SPX1 may display a red color, the second main sub pixels SPX2 may display a green color, and the third main sub pixels SPX3 may display a blue color. However, the first to third main sub pixels SPX1 to SPX3 are not limited thereto and, as an example, may be main sub pixels for respectively displaying yellow, cyan, and magenta colors.

The plurality of main logic pixels MPX and the plurality of white logic pixels WPX are arranged in a matrix along the first direction DR1 and the second direction DR2.

A set of sub pixels sequentially arranged along the second direction DR2 from among the plurality of sub pixels SPX may be defined as a pixel row and a set of sub pixels sequentially arranged along the first direction DR1 may be defined as a pixel column. The display panel 100 may include a plurality of pixel rows and a plurality of pixel columns. First to eighth pixel columns C1 to C8 from among the plurality of pixel columns and first to eighth pixel rows R1 to R8 from among the plurality of pixel rows are shown in FIGS. 4A to 4C.

Each of the plurality of main logic pixels MPX may be adjacent to the plurality of white logic pixels WPX. In more detail, the plurality of main logic pixels MPX and the plurality of white logic pixels WPX may be disposed alternately. For example, based on a main logic pixel corresponding to the fourth pixel row R4 and the third or fourth pixel column C3 or C4, a closest white logic pixel may be disposed in the first direction DR1, in a direction opposite (reverse) to the first direction DR1, in the second direction DR2, and/or in a direction opposite (reverse) to the second direction DR2.

Referring to FIGS. 4A and 4B, each of the plurality of white sub pixels SPXW may be divided into two gamma values and driven based on the first gamma curve GAM1 or the second gamma curve GAM2.

Referring to FIG. 4A, white sub pixels corresponding to the second and sixth pixel columns C2 and C6 may display an image by receiving a voltage of a high grayscale value based on the first gamma curve GAM1. White sub pixels corresponding to the fourth and eighth pixel columns C4 and C8 may display an image by receiving a voltage of a low grayscale value based on the second gamma curve GAM2.

For example, when white sub pixels corresponding to the second pixel row R2 are designated as first white sub pixels SPXW1*a* and white sub pixels corresponding to the third pixel row R3 are designated as second white sub pixels SPXW2*a*, the first white sub pixels SPXW1*a* may receive a first white pixel voltage that is a voltage of a high grayscale value based on the first gamma curve GAM1 and the second white sub pixels SPXW2*a* may receive a second white pixel voltage that is a voltage of a low grayscale value based on the second gamma curve GAM2.

Referring to FIG. 4B, when a white sub pixel corresponding to the second pixel column C2 and the second pixel row R2 and a white sub pixel corresponding to the fourth pixel column C4 and the third pixel row R3 are designated as first white sub pixels SPXW1*b* and a white sub pixel corresponding to the second pixel column C2 and the fourth pixel row R4 and a white sub pixel corresponding to the fourth pixel column C4 and the fifth pixel row R5 are designated as second white sub pixels SPXW2*b*, the first white sub pixels SPXW1*b* may receive a voltage of a grayscale value based on the first gamma curve GAM1 and the second white sub pixels SPXW2*b* may receive a voltage of a grayscale value based on the second gamma curve GMA2.

A voltage of a grayscale value based on the first gamma curve GAM1 may be a relatively higher voltage than a voltage of a grayscale value based on the second gamma curve GAM2.

In FIGS. 4C and 4D, third and fourth gamma curves GAM3 and GAM4 other than the first and second gamma curves GAM1 and GAM2 may be additionally included.

Referring to FIGS. 2A, 4C, and 4D, for the same grayscale value, the third gamma curve GAM3 may have a higher brightness value than the reference gamma curve GR and have a lower brightness value than the first gamma curve GAM1, and the fourth gamma curve GAM4 may have a lower brightness value than the reference gamma curve GR and have a higher brightness value than the second gamma curve GAM2.

Accordingly, referring to FIGS. 4C and 4D, each of the white sub pixels may be divided into four gamma values and driven based on the first gamma curve GAM1, the second gamma curve GAM2, the third gamma curve GAM3, and the fourth gamma curve GAM4.

Referring to FIG. 4C, a white sub pixel corresponding to the second pixel column C2 and the second pixel row R2 may receive a voltage of a grayscale value based on the third gamma curve GAM3, and a white sub pixel corresponding to the second pixel column C2 and the fourth pixel row R4 may receive a voltage of a grayscale value based on the fourth gamma curve GAM4. In the same manner, a white sub pixel corresponding to the second pixel column C2 and the sixth pixel row R6 may receive a voltage of a grayscale value based on the third gamma curve GAM3, and a white sub pixel corresponding to the second pixel column C2 and the eighth pixel row R8 may receive a voltage of a grayscale value based on the fourth gamma curve GAM4. A voltage of a grayscale value based on the third gamma curve GAM3 may have a relatively higher voltage value than a voltage of a grayscale value based on the fourth gamma curve GAM4.

The driving of the white sub pixel of the second pixel column C2 may be applied to the driving of the white sub pixel of the sixth pixel column C6.

A white sub pixel corresponding to the fourth pixel column C4 and the first pixel row R1 may receive a voltage of a grayscale value based on the first gamma curve GAM1; a white sub pixel corresponding to the fourth pixel column C4 and the third pixel row R3 may receive a voltage of a grayscale value based on the second gamma curve GAM2; a white sub pixel corresponding to the fourth pixel column C4 and the fifth pixel row R5 may receive a voltage of a grayscale value based on the first gamma curve GAM1; and a white sub pixel corresponding to the fourth pixel column C4 and the seventh pixel row R7 may receive a voltage of a grayscale value based on the second gamma curve GAM2.

The driving of the white sub pixel of the fourth pixel column C4 may be applied (e.g., identically applied) to the driving of the white sub pixel of the eighth pixel column C8.

Referring to FIGS. 2A, 4C, and 4D, third gamma white data may be data converted by the splitter 204 that receives the rendering white data RW based on the third gamma curve GAMS and fourth gamma white data may be data converted by the splitter 204 that receives the rendering white data RW based on the fourth gamma curve GAM4.

As mentioned above, in the compensation lookup table SLUT, a gamma compensation value corresponding to the third gamma white data and a gamma compensation value corresponding to the fourth gamma white data may be defined.

In the same manner as described above, the gamma compensator 202 may gamma-compensate the mapping main data PR, PG, and PB based on a gamma compensation value corresponding to first to fourth gamma white data to generate the compensation main data SR, SG, and SB.

The remaining contents may be similar to (e.g., the same as or identical to) those described with reference to FIGS. 2A, 2B, 3A, and 3B and thus detailed descriptions thereof may be omitted.

As the white sub pixels SPXW use a space division method for receiving a voltage of a different grayscale value based on a plurality of gamma curves, skin wash out phenomenon and color shift phenomenon, which occur from an image displayed by a display panel, also may be alleviated. Furthermore, through the gamma compensation method of the gamma compensator 202 described with reference to FIGS. 2A, 2B, 3A, and 3B, skin wash out phenomenon and color shift phenomenon may be further alleviated.

Figure 5A:
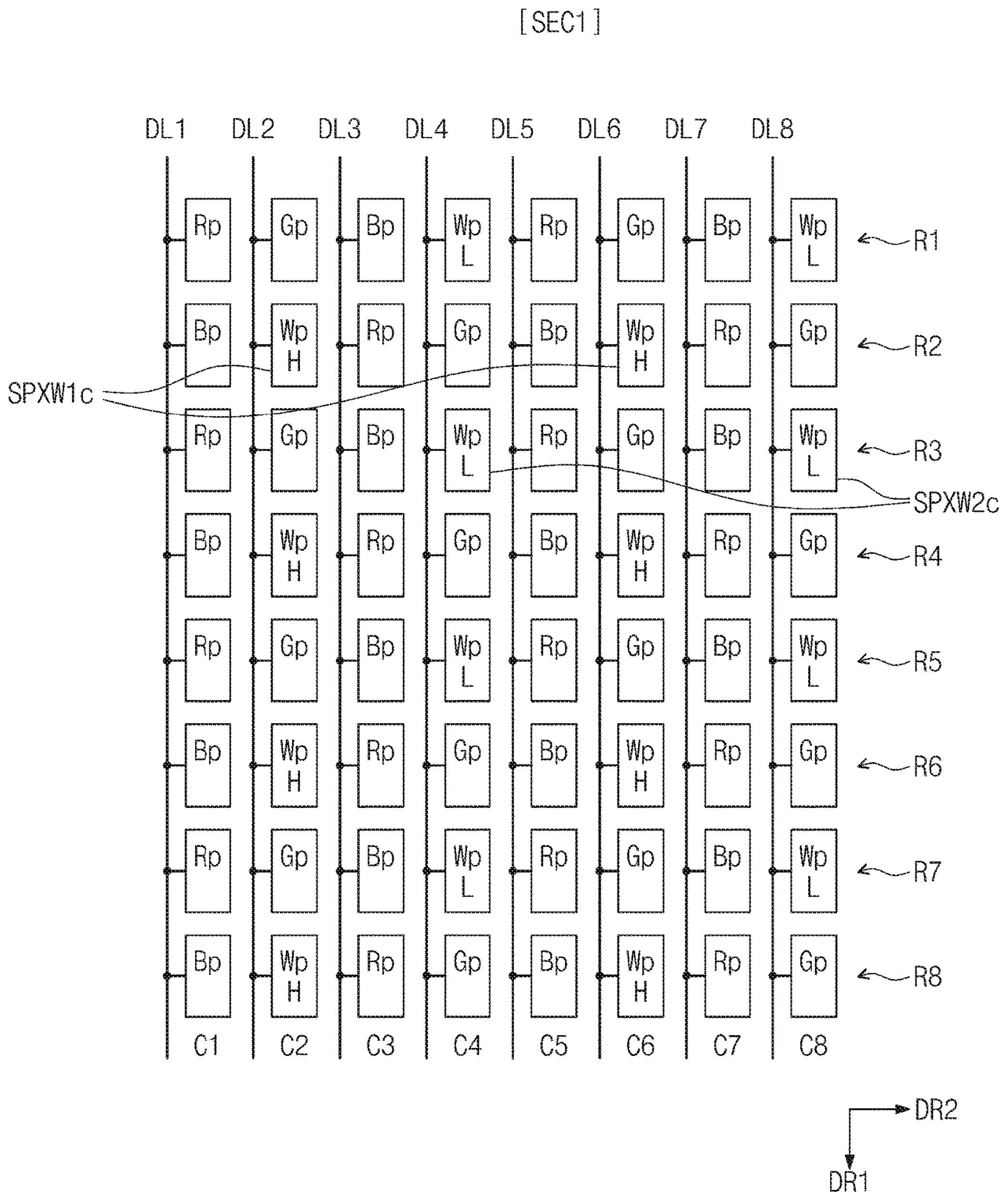
FIG. 5A is a view illustrating time division driving of a display panel according to an embodiment of the inventive concept.
Figure 5B:
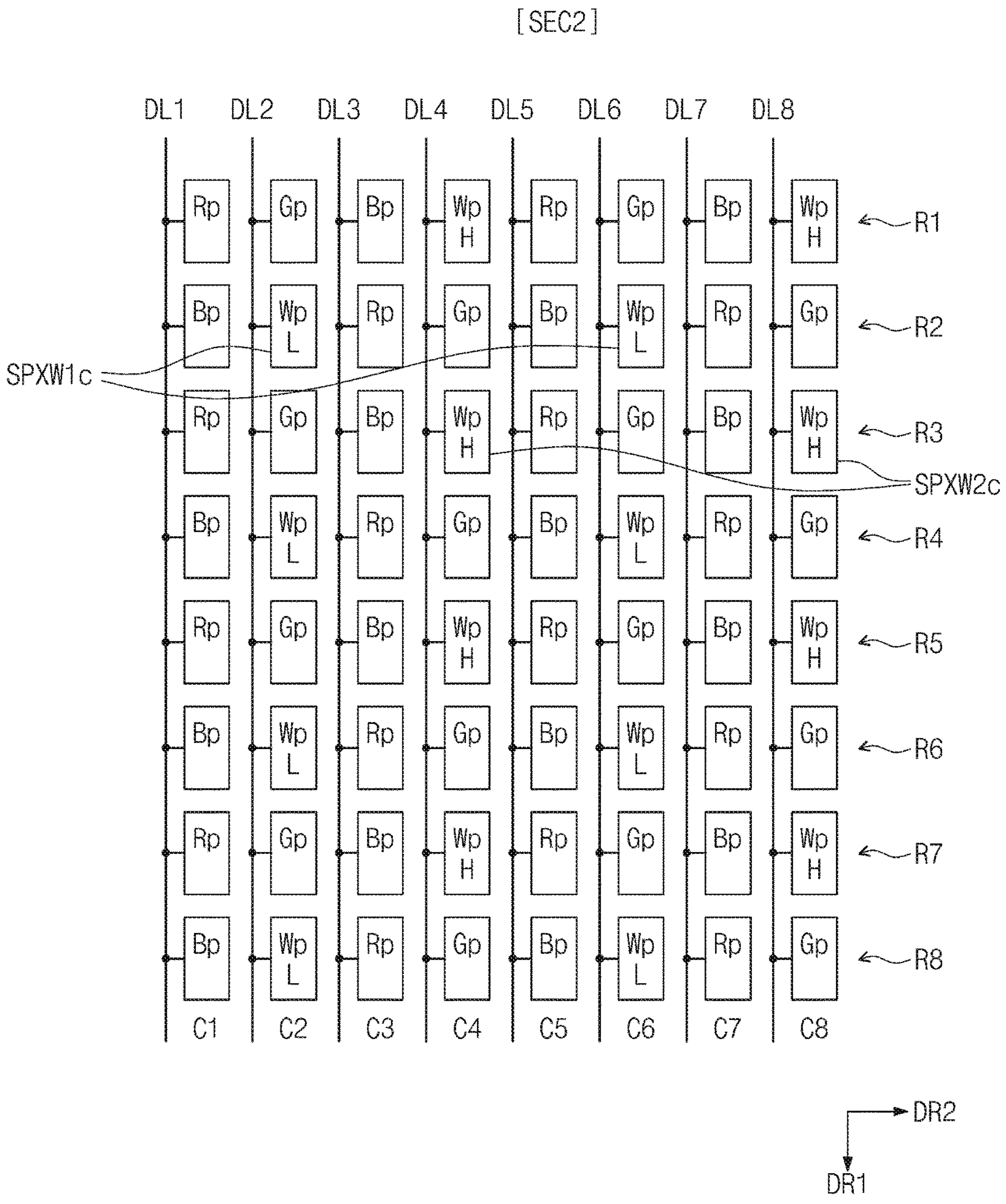
FIG. 5B is a view illustrating time division driving of a display panel according to another embodiment of the inventive concept.

FIGS. 5A and 5B are views illustrating time division driving of a display panel according to an embodiment of the inventive concept.

The description for a display panel shown in FIGS. 5A and 5B is similar to (e.g., the same as or identical to) that shown in FIG. 4A and thus may be omitted.

In order to describe the time division driving of the display panel, a first section SEC1 and a second section SEC2 are described.

The second section SEC2 may be a section that is temporally subsequent to the first section SEC1.

Each of the first section SEC1 and the second section SEC2 may correspond to at least n frames (where n is a natural number). Accordingly, the first section SEC1 may be a section corresponding to one frame and the second section SEC2 may be a section corresponding to two frames.

The description below is directed to the first section SEC1 and the second section SEC2, but the embodiments of the inventive concept are not limited thereto, and it should be apparent that additional sections subsequent to the second section SEC2 and corresponding to n frames may also be defined.

Referring to FIGS. 5A and 5B, white sub pixels corresponding to the second pixel row R2 may be designated as first white sub pixels SPXW1*c* and white sub pixels corresponding to the third pixel row R3 may be designated as second white sub pixels SPXW2*c*.

FIG. 5A illustrates a driving state of the display panel in the first section SEC1.

In the first section SEC1, the first white sub pixels SPXW1*c* may display an image by receiving a voltage of a high grayscale value based on the first gamma curve GAM1. The second white sub pixels SPXW2*c* may display an image by receiving a voltage of a low grayscale value based on the second gamma curve GAM2.

FIG. 5B illustrates a driving state of the display panel in the second section SEC2.

In the second section SEC2, the first white sub pixels SPXW1*c* may display an image by receiving a voltage of a low grayscale value based on the second gamma curve GAM2. The second white sub pixels SPXW2*c* may display an image by receiving a voltage of a high grayscale value based on the first gamma curve GAM1.

As the display panel is driven with time division as shown in FIGS. 5A and 5B, the same or substantially the same effect as the time division driving described with reference to FIGS. 4A and 4B may be achieved.

A display device of embodiments of the inventive concept includes the gamma compensator for determining a final gamma compensation value by using a gamma compensation value corresponding to first gamma white data and a gamma compensation value corresponding to second gamma white data. As the gamma compensator performs gamma compensation by using the final gamma compensation value, side visibility distortion occurring as each of a plurality of white sub pixels receives a high voltage or low voltage may be improved.

Although exemplary embodiments of the present invention have been described, it should be understood that the present invention should not be limited to these exemplary embodiments but various changes and modifications can be made by one of ordinary skill in the art within the spirit and scope of the present invention as set forth in the following claims and their equivalents.

What is claimed is:

1. A display device comprising:

a mapping unit configured to map main color data having information on three main colors to generate mapped main data comprising red, green, and blue information and mapped white data comprising white information;

a compensation lookup table configured to store a plurality of gamma compensation values;

a gamma compensator configured to generate compensated main data obtained by gamma-compensating the mapped main data based on a first gamma compensation value corresponding to first gamma white data from among the plurality of gamma compensation values and a second gamma compensation value corresponding to second gamma white data from among the plurality of gamma compensation values by referring to the compensation lookup table;

a renderer configured to sub-pixel-render the mapped white data to generate rendered white data; and a splitter configured to convert the rendered white data into the first and second gamma white data based on different first and second gamma curves, respectively.

2. The display device of claim 1, wherein each of the plurality of gamma compensation values comprises a red gamma compensation value, a green gamma compensation value, and a blue gamma compensation value to be compensated according to grayscale values of the first and second gamma white data.

3. The display device of claim 2, wherein the gamma compensator is configured to generate the compensated main data based on the first gamma compensation value and the second gamma compensation value.

4. The display device of claim 3, wherein the first gamma compensation value comprises a first red gamma compensation value, a first green gamma compensation value, and a first blue gamma compensation value, wherein the second gamma compensation value comprises a second red gamma compensation value, a second green gamma compensation value, and a second blue gamma compensation value, and wherein the gamma compensator is configured to add an average value of the first red gamma compensation value and the second red gamma compensation value, an average value of the first green gamma compensation value and the second green gamma compensation value, and an average value of the first blue gamma compensation value and the second blue gamma compensation value to the mapped main data to generate the compensated main data.

5. The display device of claim 1, wherein the renderer is configured to resample-filter the mapped white data to generate the rendered white data.

6. The display device of claim 1, further comprising a split lookup table configured to store high white data values obtained by sampling-converting white data grayscale values based on the first gamma curve and to store low white data values obtained by sampling-converting the white data grayscale values based on the second gamma curve, wherein the splitter is configured to generate the first or second gamma white data by referring to the split lookup table.

7. The display device of claim 1, wherein for the same grayscale value, the first gamma curve has a higher brightness value than a reference gamma curve, and the second gamma curve has a lower brightness value than the reference gamma curve.

8. The display device of claim 7, wherein a gamma value of the reference gamma curve is about 2.2.

9. The display device of claim 1, further comprising a data driver configured to convert the first and second gamma white data into first and second white pixel voltages, respectively.

10. The display device of claim 9, further comprising a display panel comprising:

a plurality of main logic pixels each comprising a first main sub pixel and a second main sub pixel; and a plurality of white logic pixels each comprising a third main sub pixel and one of a plurality of white sub pixels configured to display white, wherein the first to third main sub pixels are configured to display different main colors from among red, green, and blue; and wherein the display device is configured such that a first white sub pixel from among the plurality of white sub pixels receives the first white pixel voltage and a second white sub pixel from among the plurality of white sub pixels receives the second white pixel voltage.

11. The display device of claim 10, wherein each of the plurality of main logic pixels is adjacent to a corresponding one of the plurality of white logic pixels.

12. The display device of claim 9, further comprising a display panel comprising:

a plurality of main logic pixels each comprising a first main sub pixel and a second main sub pixel; and a plurality of white logic pixels each comprising a third main sub pixel and one of a plurality of white sub pixels configured to display white, wherein the first main sub pixel, the second main sub pixel, and the third main sub pixel each display different main colors from among red, green, and blue, and wherein the display device is configured such that in a first section, a first white sub pixel from among the plurality of white sub pixels receives the first white pixel voltage and a second white sub pixel from among the plurality of white sub pixels receives the second white pixel voltage, and in a second section that is temporally subsequent to the first section, the first white sub pixel receives the second white pixel voltage, and the second white sub pixel receives the first white pixel voltage.

13. The display device of claim 12, wherein each of the first and second sections corresponds to at least n frames (where n is a natural number).

14. The display device of claim 13, wherein for the same grayscale value, the first gamma curve has a higher brightness value than a reference gamma curve and the second gamma curve has a lower brightness value than the reference gamma curve.

15. A display device driving method comprising:

mapping, with a mapping unit, main color data comprising information on three main colors;

generating, with the mapping unit, mapped main data comprising red, green, and blue information and mapped white data comprising white information;

gamma-compensating, with a gamma compensator, the mapped main data to generate compensated main data based on a first gamma compensation value corresponding to first gamma white data from among a plurality of gamma compensation values and a second gamma compensation value corresponding to second gamma white data from among the plurality of gamma compensation values;

sub-pixel-rendering, with a renderer, the mapped white data to generate rendered white data; and converting, with a splitter, the rendered white data into first and second gamma white data based on different first and second gamma curves, respectively.

16. The method of claim 15, wherein each of the plurality of gamma compensation values comprises a red gamma compensation value, a green gamma compensation value, and a blue gamma compensation value to be compensated according to white data grayscale values, wherein the first gamma compensation value comprises a first red gamma compensation value, a first green gamma compensation value, and a first blue gamma compensation value, and wherein the second gamma compensation value comprises a second red gamma compensation value, a second green gamma compensation value, and a second blue gamma compensation value.

17. The method of claim 16, wherein the generating of the compensated main data comprises:

calculating a first average value of the first red gamma compensation value and the second red gamma compensation value;

calculating a second average value of the first green gamma compensation value and the second green gamma compensation value;

calculating a third average value of the first blue gamma compensation value and the second blue gamma compensation value; and adding the first to third average values to the mapped main data to generate the compensated main data.

18. The method of claim 16, wherein the first gamma curve has a higher brightness value than a reference gamma curve for the same grayscale value, and the second gamma curve has a lower brightness value than the reference gamma curve for the same grayscale value.

19. The method of claim 18, wherein a gamma value of the reference gamma curve is about 2.2.

20. The method of claim 16, further comprising converting the first and second gamma white data into first and second white pixel voltages, respectively.

* * * * *